United States Patent
Sjölund et al.

(10) Patent No.: US 7,073,458 B2
(45) Date of Patent: Jul. 11, 2006

(54) SYSTEM AND METHOD FOR MILKING ANIMALS

(75) Inventors: Martin Sjölund, Stockholm (SE); Mattias Oscarsson, Hägersten (SE)

(73) Assignee: DeLaval Holding AB, Tumba (SE)

( * ) Notice: Subject to any disclaimer, the term of this patent is extended or adjusted under 35 U.S.C. 154(b) by 0 days.

(21) Appl. No.: 10/478,646

(22) PCT Filed: Jun. 19, 2002

(86) PCT No.: PCT/SE02/01193

§ 371 (c)(1),
(2), (4) Date: Nov. 25, 2003

(87) PCT Pub. No.: WO02/102142

PCT Pub. Date: Dec. 27, 2002

(65) Prior Publication Data

US 2004/0182325 A1   Sep. 23, 2004

(30) Foreign Application Priority Data

Jun. 19, 2001 (SE) .................................. 0102162

(51) Int. Cl.
*A01J 5/00* (2006.01)
(52) U.S. Cl. .................. 119/14.02; 119/14.08
(58) Field of Classification Search ............. 119/14.02, 119/14.08

See application file for complete search history.

(56) References Cited

U.S. PATENT DOCUMENTS 3,499,422 A * 3/1970 Nelson ..................... 119/14.08
4,851,741 A 7/1989 Daggett et al.

(Continued)

FOREIGN PATENT DOCUMENTS

EP 0091892 A2 10/1983

(Continued)

OTHER PUBLICATIONS

Notice of Opposition dated Jan. 17, 2006.

(Continued)

*Primary Examiner*—Michael Carone
*Assistant Examiner*—Bret Hayes
(74) *Attorney, Agent, or Firm*—Harness, Dickey & Pierce, P.L.C.

(57) ABSTRACT

A milking system may include a milking stall (1, 51), which an animal may visit to be milked automatically. The milking stall including an animal identifier (9, 53); a gate controller (7, 55) for opening an entry and exit gates (3, 5); a milking machine (11, 57), wherein the teat cups, during milking of a milking animal in the milking stall, are applied to the teats of the milking animal and are connected to vacuum (19, 63) such that milk can be drawn from the milking animal and be collected in the vessel; and a robot (13, 65) provided with a robot arm (21) and a gripper (23) for automatic application of the teat cups to the teats of the animal. The milking system may also include a master computer (75) adapted to hold a database (77) of milking animals capable of visiting the milking stall, to receive an identification of a milking animal from the animal identifier, and adapted to control the gate controller, the milking machine, and the robot depending on the received identification. The robot may include a slave processor (81), connected to receive information from the master computer, according to which movement of the robot arm of the robot is to be performed, and adapted to control the robot to move the robot arm of the robot according to the received information.

21 Claims, 2 Drawing Sheets

U.S. PATENT DOCUMENTS

| | | | |
|---|---|---|---|
| 5,826,536 A * | 10/1998 | van der Lely et al. | 119/14.02 |
| 5,889,924 A | 3/1999 | Okabayashi et al. | |
| 5,918,566 A * | 7/1999 | van den Berg | 119/14.02 |
| 5,996,529 A | 12/1999 | Sisson et al. | |
| 6,167,838 B1 * | 1/2001 | van den Berg | 119/14.02 |
| 6,167,839 B1 * | 1/2001 | Isaksson et al. | 119/14.08 |
| 6,199,507 B1 * | 3/2001 | Cassells | 119/14.02 |
| 6,213,052 B1 * | 4/2001 | Oosterling | 119/14.08 |
| 6,394,028 B1 * | 5/2002 | Birk | 119/14.08 |

FOREIGN PATENT DOCUMENTS

| | | |
|---|---|---|
| EP | 0639327 | 2/1995 |
| EP | 0657098 | 6/1995 |
| EP | 0663146 | 7/1995 |

OTHER PUBLICATIONS

Dieter Schillingmann, "Untersuchungen zum robotergestützten Melken," *VDI-Verlag GmbH*, 1992, pp. 1-201.

* cited by examiner

SYSTEM AND METHOD FOR MILKING ANIMALS

TECHNICAL FIELD OF THE INVENTION

The present invention generally relates to dairy farming and particularly it relates to a computer-controlled system and a method, respectively, for milking animals.

DESCRIPTION OF RELATED ART AND BACKGROUND OF THE INVENTION

In modern dairy farm industry there are continuous research and development activities in order to improve the efficiency of various activities such as machine milking, which, inter alia, involves increased milk yield and reduced milking time.

A major trend in this respect is an increased degree of automation of the various activities. For instance, machine milking may be performed completely automated by means of computer-controlled milking robots.

A diagram of an automatic milking station is schematically illustrated in FIG. 1. A milking stall 1, which animals may visit on a voluntary basis to be milked, includes an entry gate 3 and an exit gate 5, respectively, which can be opened and closed by means of a gate opening/closing arrangement 7. At the entry gate there is arranged an animal identification arrangement 9 for identification of an animal presenting itself at the entry gate 3. Within milking stall 1 there is arranged a milking machine 11 and a robot 13.

The milking machine 11 includes four teat cups, schematically indicated at 15, connected to a milk collection vessel or end unit 17 and to a source of vacuum 19. Further, the milking machine includes typically a number of none illustrated valves, a milk flow meter, a feeding device or other enticing means, and cleaning capabilities.

The robot 13 includes a robot arm 21 and a gripper 23 for automatic application of the teat cups 15 to the teats of a milking animal present in the stall 1. Further, a video camera 25 is arranged on the robot arm 21 close to the gripper 23 to allow for an adaptive control of actions performed.

The gate opening/closing arrangement 7, the animal identification arrangement 9, the milking machine 11, the robot 13 and the video camera 25 are each connected to a computer (PC) 27 by means of a respective individual signal conduit. The computer 27 manages and controls the performance of the milking station according to software installed therein. To this end computer 27 holds a database (DB) 29 of milking animals capable of visiting milking stall 1 and records inter alia points of time at which each one of the milking animals capable of visiting milking stall 1 is milked.

Further, the computer 27 may be provided with a touch screen (TS) 31 or other suitable output/input means in order to inform a human user of the milking station and to allow the user to modify/alter the software installed therein.

During operation the gates 3 and 5 are initially closed and when a milking animal presents herself at the entry gate 3 she is identified by means of the animal identification arrangement and this identification is transferred to the computer 27, which depending on e.g. the time lapsed since she was milked last makes a decision if she should be allowed to be milked or not. If the decision is affirmative, the computer 27 controls the gate opening/closing arrangement 7 to firstly open entry gate 3 to allow the identified milking animal to enter milking stall 1, and to subsequently, when the identified milking animal has entered milking stall 1, close entry gate 3.

Thereafter, the computer 27 controls the robot 13 to apply the teat cups 15 of the milking machine 11, one at a time, to the teats of the milking animal present in the milking stall 1. Such control is typically performed depending on image information as received from video camera 25.

When a teat cup 15 has been applied to a teat of the animal the computer 27 initiates milking of that teat by means of activating the source of vacuum 19 or opening a none-illustrated valve. During milking, milk is drawn from the teats of the milking animal and is collected in vessel 17 and the amount of milk drawn is typically recorded by means of one or several none-illustrated milk flow meters. When the milk flow falls below a threshold value or when a predetermined period of time has passed milking is ended by means of the computer 27 controls the source of vacuum 19 or one or several none-illustrated valves of the milking machine 11.

The teat cups are removed from the teats of the animal and are typically returned to an idle position by robot 13 or by any other suitable means.

Finally, the computer 27 controls the gate opening/closing arrangement 7 to firstly open exit gate 5 to allow the milked milking animal to leave milking stall 1, and to subsequently, when the milked animal has left milking stall 1, close exit gate 5. The dashed arrows indicate thus the path a milking animal, which is milked, follows through the milking station.

A drawback of such a milking station is that the capacity thereof is limited since only one animal at a time can be milked.

A drawback of using two or more milking stations in an area intended to house a herd of milking animals is that there is no coordination between the milking stations and thus an animal, having recently been milked in one milking station, may present herself at another milking station and be allowed to be milked therein. Such performance is neither optimal from a milk production point of view nor from animal health point of view.

SUMMARY OF THE INVENTION

The inventors have realized that if a plurality of milking stations are to be used to increase the milking capacity of a dairy farm a coordination between them are needed.

It is thus an object of the present invention to provide a computer-controlled milking system comprising a milking stall, which facilitates the addition of further milking stalls to obtain a milking system comprising at least two coordinated milking stalls.

It is a further object of the invention to provide such a system, which is reliable, flexible, easy to maintain and trouble-shoot, and of reasonably low cost.

It is still a further object of the present invention to provide a computer-controlled method for milking of animals, which facilitates milking of at least two animals simultaneously.

It is yet a further object of the invention to provide such a method, which is simple, reliable, flexible, and of reasonably low cost.

These objects, among others, are according to the present invention attained by systems and methods as claimed in the appended patent claims.

By the provision of a distributed modular milking system including a master computer for the overall control of the system and a slave processor at the robot for the detailed control of the robot movement the addition of further milking stalls to the system is facilitated. Such further milking stalls may each have its own robot provided with a slave-computer or all milking stalls may use a common robot.

The slave processor, which is preferably a DSP or PIC processor, is connected to receive signals indicative of target position x, y, z or velocity (x', y', z' coordinates from the master computer, according to which movement of the robot is to be performed, and is adapted to control, preferably adaptively, the robot to move according to the received signals. Hereby, the master computer is relieved, and large processor resources are freed to be used for other purposes such as overall control of further milking stalls.

Further, the robot provided with the slave processor and other computer-controlled equipment of the milking stall such as an animal identification arrangement, a gate opening/closing arrangement, a milking machine (i.e. control valves thereof), a milk meter and a cleaning machine may be connected to the master computer via a single serial bus, where each equipment or node is associated with a respective bus address such that the master computer is able to identify the equipment.

Preferably, further equipment such as e.g. a milking machine or a cleaning machine may be provided with slave processors to further distribute the intelligence of the system locally and free resources of the master computer. Thus, a computer having lower processor capacity may be used as master computer, and more advanced algorithms may be used locally since these do not affect the resources of the master computer nor the traffic on the bus.

Such a distributed modular milking system with a plurality of equipment on a single serial bus provides for a high level of flexibility both as regards the addition of further milking stalls to the system and as regards the number and kind of equipment in a single stall. Further, such approach makes the milking system easy to maintain and troubleshoot. Fewer longer cables are needed (only access to the bus is needed and not all the way to the master computer) and fewer connections at the master computer are required.

Further characteristics of the invention and advantages thereof will be evident from the following detailed description of preferred embodiments of the invention given hereinbelow and from the accompanying FIGS. 1–2, which are given by way of illustration only, and thus are not limitative of the present invention.

In the detailed description the milk-producing animals are cows. However, the invention is not limited to cows, but is applicable to any animals having the capability to produce large quantities of milk, such as sheep, goats, buffaloes, horses, etc.

DETAILED DESCRIPTION OF EMBODIMENTS

In the following description, for purposes of explanation and not limitation, specific details are set forth, such as particular techniques and applications in order to provide a thorough understanding of the present invention. However, it will be apparent to one skilled in the art that the present invention may be practiced in other embodiments that depart from these specific details.

Figure 2:
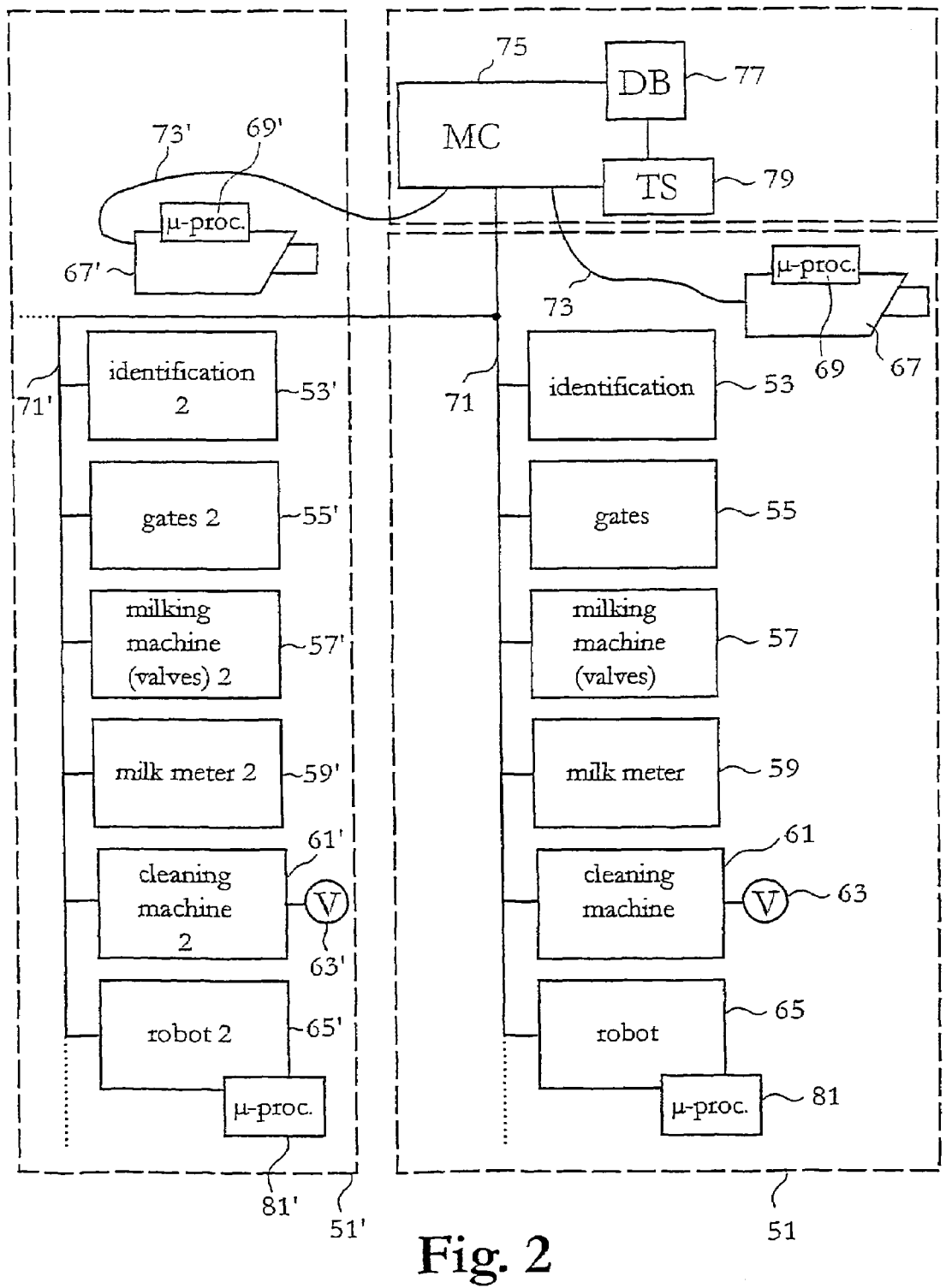
FIG. 2 illustrates, in a schematic block diagram, a milking system according to an embodiment of the present invention.

With reference now to FIG. 2, which illustrates, in a schematic block diagram, a computer-controlled milking system a preferred embodiment of the present invention will be described. The invention is primarily focused on the control of the milking and how such control is distributed in the system. Thus, the description is not concerned with the design and detailed operation of each individual apparatus and device.

Figure 1:
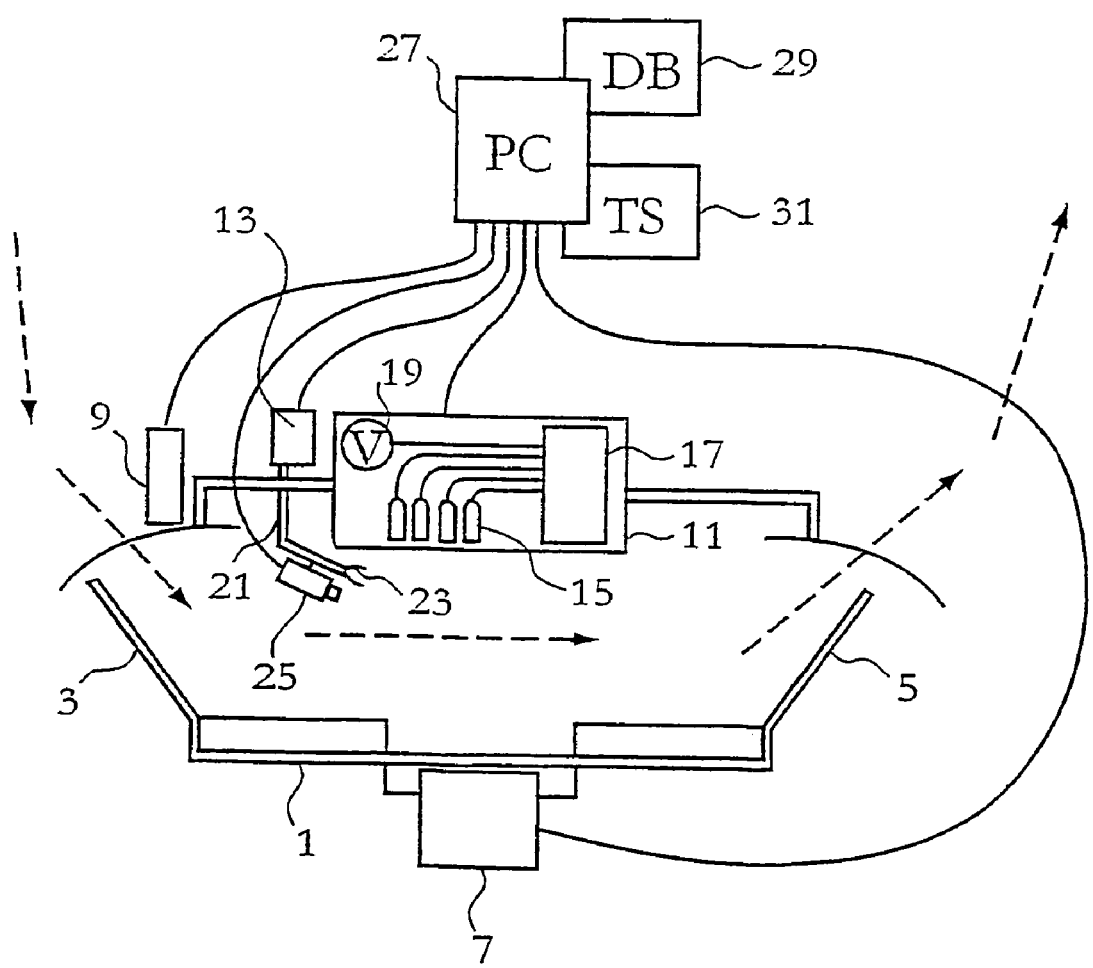
FIG. 1 illustrates, schematically, a milking station according to prior art.

The system of FIG. 2 comprises a milking stall 51, which a cow may visit to be milked automatically. The milking stall 51 may have a design similar to the design of the milking station 1 of FIG. 1 and includes a cow identification arrangement 53, a gate opening/closing arrangement 55, a milking machine 57, a milk meter 59, a cleaning machine 61, a source of vacuum 63, and a robot 65. The milking stall may comprise further equipment, such as e.g. a milk quality measurement device.

The cow identification arrangement is capable of identifying a cow presenting herself at an entry gate (not illustrated) to milking stall 51. The gate opening/closing arrangement 55 is capable of opening and closing the entry gate to milking stall 51 and an exit gate from milking stall 51. Typically, the gate opening/closing arrangement 55 opens the entry gate to allow a cow to enter milking stall 51 after having been identified, closes the exit gate to allow the cow to leave milking stall 51 after having been milked.

The milking machine 57 includes teat cups connected to a milk collecting vessel (not illustrated), wherein the teat cups, during milking of a cow present in milking stall 51, are applied to the teats of the cow and are connected to the source of vacuum 63 such that milk can be drawn from the teats of the cow and be collected in the milk collecting vessel, and else the teat cups are stored in a magazine (not illustrated) for the purpose. A milk meter 59 is arranged in milking machine 57 and is capable of individually measuring the amount of milk drawn from each teat during milking.

The cleaning machine 61 is capable of cleaning the milking machine 57, i.e. the milk-contacting surfaces thereof, and may include a pump and cleaning fluid supply (not illustrated). In the illustrated case the source of vacuum 63 is connected to the cleaning machine 61 and is typically activated as soon as cleaning is finished. Thus the milking machine is typically controlled by means of non-illustrated control valves in pipes between the respective teat cups and the source of vacuum.

The robot 65 is provided with a robot arm and a gripper (not illustrated) and is capable of gripping teat cups, one at a time, at a respective magazine; moving teat cups, one at a time, to beneath the teats of a cow present in the respective milking stall; and applying teat cups, one at a time, to the teats of the cow. In order to facilitate such action a video camera 67 provided with a microprocessor is mounted on the robot arm of robot 65 and image related data from video camera 67 is used in the control of robot 65 while applying teat cups to the teats of a cow present in milking stall 51. The robot 65 may includes a pneumatic driving controlled by means of three valves (not illustrated) for the movement of the robot arm in three mutually perpendicular directions x, y, z, or alternatively the robot 65 includes an electrical driving, particularly three electrical motors, for the movement of the robot arm in the three directions x, y, z.

The computer-controlled milking system of FIG. 2 further comprises a master computer 75, which manages and controls the performance of the milking system according to software installed therein. The master computer 75 holds a database 77 of cows capable of visiting milking stall 51 and may be provided with a touch screen 79 or other suitable output/input means such as a computer screen and a mouse or a keyboard in order to allow an operator to modify/alter the software installed therein or to perform other operations.

The master computer is adapted to record points of time, at which each one of the cows capable of visiting milking stall 51 is milked therein, to receive information from cow identification arrangement 53 and milk meter 59, and to control gate opening/closing arrangement 55, milking machine 57, cleaning machine 61, vacuum source 63 and robot 65 depending on the identification received from the cow identification arrangement 53.

According to the present invention the robot 65 includes a slave processor 81, particularly a DSP, connected to receive signals indicative of target position x, y, z or velocity x', y', z' coordinates from master computer 75, according to which movement of the robot arm of the robot 65 is to be performed, and adapted to control robot 65 to move the robot arm according to the signals received from the master computer 75.

Preferably, robot 65 includes position sensors (not illustrated) for repeatedly sensing a position of the robot arm of the robot and for repeatedly providing slave processor 81 of the robot with the positions, which are used in the control of the movement of the robot. In such manner the movement is controlled adaptively and a very accurate and precise movement is achieved.

By providing the robot with a slave processor the requirements of the processing capacity of the master computer are relaxed and the freed capacity may be used in the control of further milking stalls. The use of a processor at the camera 67 further decreases the capacity requirements on the master computer 75.

Furthermore, the master computer 75 and the slave processor 81 of the robot may be adapted to communicate with each other using a high-level protocol on top of a transmission protocol, e.g. TCP/IP. In such instance the master computer operates as a client in the system (i.e. sends a request and receives a confirmation) and the robot processor is operating as a server in the system (i.e. receives a request, performs an action, and sends a confirmation) and thus the flexibility is further increased, trouble-shooting is further simplified, and the capacity requirements of the master computer is further decreased.

It shall be appreciated that other equipment of the milking stall 51 may be provided with a processor to further distribute the intelligence of the system and thus provide the milking system in a modular fashion. Particularly, the milking machine 57 and the cleaning machine 61 could be provided with their own processors to obtain a more local control of the various detailed operations to be performed.

In the illustrated embodiment the cow identification arrangement 53, the gate opening/closing arrangement 55, the milking machine 57, the milk meter 59, the cleaning machine 61, the vacuum source 63, and the robot 65 of the milking stall 51 are connected to the master computer 75 via a serial bus, wherein each one of the cow identification arrangement 53, the gate opening/closing arrangement 55, the milking machine 57, the milk meter 59, the cleaning machine 61, the vacuum source 63, and the robot 65 is associated with a respective bus address such that the master computer 75 is able to identify them. By such connections the milking system become flexible and is easily extended to incorporate further milking stalls. Trouble-shooting is easier and the connection and disconnection of additional equipment are simplified.

The video camera 67 is in the illustrated embodiment, however, connected directly to the master computer by means of a serial cable 73, preferably a RS232 serial cable.

Preferably, the processor 69 of the video camera 65 is adapted to process raw data as recorded by the camera and to derive possible teat positions from the raw data. Thus only the possible teat positions have to be transferred to the master computer 75 and the capacity requirements on the serial connection and on the master computer are lowered.

Alternatively, the raw data as recorded by the video camera 65 is transferred to the master computer 75 and thus the processor 69 may be dispensed with.

Still alternatively, the video camera 65 could be connected to the master computer 75 via the serial bus 71 if smaller amounts of image related data could be sent to the master computer, or if the serial bus is fast enough. In such a configuration the robot 65 and the video camera 67 may share a common processor and either one of the processors 69, 81 may be dispensed with.

In yet a further alternative version of the invention the robot is not connected to the master computer 75 via the serial bus 71, but has a separate direct-in line, e.g. a serial line (not illustrated), to the master computer, or possibly share the serial line 73 with the video camera 67. In such instance the slave processor 81 of the robot may be a simpler and cheaper PIC processor.

In a particular version of the invention wherein the robot 65 and the video camera 67 are a single entity with respect to the communication with master computer 75 (the robot 65 and the video camera 67 being either provided with a respective processor and being connected to each other, or are using a common processor) and are connected to master computer 75 via a separate direct-in line or via a serial bus, the robot/video camera combination 65, 67 may be adapted to receive high-level commands from the master computer 75, such as e.g. "apply teat cup X to teat Y", and to perform actions based on the high-level commands, such as e.g. all actions necessary for applying teat cup X to teat Y.

As has already been indicated the computer-controlled milking system of the present invention may easily be extended to incorporate at least one further milking stall to increase the milking capacity of the system. In FIG. 2 a second milking stall 51' is shown, the second milking stall being identical with milking stall 51.

Thus, the second milking stall includes a second animal identification arrangement 53' for identifying a cow visiting second milking stall 51'; a second gate opening/closing arrangement 55' for opening an entry gate to the second milking stall 51' prior to milking, and for opening an exit gate out from the second milking stall 53' subsequent to milking; a second milking machine 57' including teat cups connected to a milk collecting vessel (not illustrated), wherein the teat cups, during milking of a cow in the second milking stall 51', are applied to the teats of the cow and are connected to a source of vacuum 63' such that milk can be drawn from the teats of the cow and be collected in the milk collecting vessel; a milk meter 59' for measuring the amount of milk drawn from the cow, a cleaning machine 61' for cleaning of inner surfaces of the milking machine 57' that come into contact with the milk; and a second robot 65' provided with a slave processor 81' for automatic application of the teat cups to the teats of the cow in the second milking stall 51'. All this equipment is connected to a serial bus 71' and each equipment is associated with a respective address such that the master computer 75 is capable of identifying each individual equipment.

Further, a video camera 67' provided with a microprocessor 69' is mounted on the robot arm of robot 65' to facilitate teat cup application, and is connected to a serial cable 73'.

During installation only the following aspects have to be considered.

The bus 71' is connected to bus 71 and it is checked that all addresses on the dual-bus 71–71' are unique. The serial cable 73' to the second video camera 67' is connected to the master computer 75, and the software of the master computer is upgraded to also take into account and control and manage the overall operation of the second milking stall 51'. To this end, the master computer shall hold a database of cows capable of visiting the second milking stall 51' and is adapted to record points of time, at which each one of the cows capable of visiting the second milking stall 51' is milked therein. Further, the master computer 75 is adapted to receive an identification of a cow visiting the second milking stall 51' from the second animal identification arrangement 53' and to control the second gate opening/closing arrangement 55', the second milking machine 57', the second vacuum source 63', and the second robot 65' depending on the identification received from the second animal identification arrangement 53'. The second robot 65' is controlled in the same manner as robot 65 is: the slave processor 81' is adapted to receive signals indicative of target position x, y, z or velocity x', y', z' coordinates from the master computer 75, according to which movement of the robot arm of the second robot is to be performed, and to control the second robot 65' to move the robot arm thereof according to the received signals.

Two cases for the implementation of the databases and the control mechanism whether a cow should be allowed to milked or not can be distinguished.

In the first case the milking stall 51 is arranged in a first enclosed area and the second milking stall 51' is arranged in a second enclosed area, the two areas being separated such that the cows capable of visiting said first milking stall are different than those capable of visiting said second milking stall (not illustrated). Here, the operation of the two milking stalls are performed independently of each other.

In the second case the first 51 and second 51' milking stalls are commonly arranged in an enclosed area such that the cows capable of visiting the first milking stall 51 are identical with those capable of visiting the second milking stall 51'. Here the master computer should hold a common database of cows capable of visiting the first and second milking stalls 51, 51' and is adapted to record points of time, at which each one of the cows capable of visiting the first and second milking stalls 51, 51' is milked in either one of said stalls.

It shall be appreciated that the alternatives described with reference to milking stall 51 also may apply to the second milking stall 51'.

It shall further be appreciated by the man skilled in the art that a third and a further milking stall may be incorporated into the milking system of FIG. 2 as is schematically indicated by the dots to the left of bus 71' in FIG. 2.

It shall still further be appreciated that each milking stall may include further equipment connected to respective serial bus 71, 71' and associated with a respective unique bus address be incorporated into the milking system as is schematically indicated by the dots beneath respective bus 71, 71' in FIG. 2. Examples of such equipment include milk quality measurement equipment, teat-cleaning equipment, and automatic feed supply units.

It shall yet further be appreciated that one of the robots 65, 65' may be dispensed with provided that the remaining robot is capable of handling both milking stalls 51, 51'.

It will be obvious that the invention may be varied in a plurality of ways. Such variations are not to be regarded as a departure from the scope of the invention. All such modifications as would be obvious to one skilled in the art are intended to be included within the scope of the appended claims.

The invention claimed is:

1. A computer-controlled milking system comprising:
    a milking stall, which a milking animal visits to be milked automatically, said milking stall including
        an animal identification arrangement for identifying a milking animal visiting said milking stall;
        a gate opening/closing arrangement for opening an entry gate to said milking stall to allow a milking animal to enter said milking stall after having been identified, and for opening an exit gate from said milking stall to allow a milking animal to leave said milking stall after having been milked;
        a milking machine including teat cups connected to a milk collecting vessel, wherein said teat cups, during milking of a milking animal present in said milking stall, are applied to the teats of the milking animal and are connected to a source of vacuum so that milk drawn from the teats of the milking animal is collected in the milk collecting vessel; and
        a robot provided with a robot arm and a gripper for automatic application of the teat cups to the teats of a milking animal present in said milking stall; and
    a master computer holding a database of milking animals available to visit said milking stall,
        said master computer to record points of time, at which each one of the milking animals available to visit said milking stall is milked therein,
        said master computer being connected to receive an identification of a milking animal visiting said milking stall from said animal identification arrangement, and
        said master computer to control said gate opening/closing arrangement, said milking machine, and said robot depending on said received identification;
    wherein said robot includes a slave processor connected to receive information from said master computer, according to which movement of the robot arm of the robot is to be performed, said slave processor to control the robot to move the robot arm of the robot according to said received information.

2. The system of claim 1 wherein said robot includes position sensors for repeatedly sensing a position of the robot arm of the robot and for repeatedly providing the slave processor of the robot with the positions to be used in the control of the movement of the robot.

3. The system of claim 1 wherein said slave processor of the robot is a PIC processor and wherein said robot is connected to said master computer via a serial cable.

4. The system of claim 1 wherein said slave processor of the robot is a DSP processor, and wherein said DSP processor is connected to said master computer via serial bus, the DSP processor being associated with a bus address.

5. The system of claim 4 wherein the master computer and the slave processor of the robot are available to communicate with each other using a high-level protocol on top of a transmission protocol.

6. The system of claim 4 wherein the animal identification arrangement, the gate opening/closing arrangement, and the milking machine of the milking stall are connected to said master computer via said serial bus, wherein each one of the animal identification arrangement, the gate opening/closing arrangement, and the milking machine is associated with a respective bus address.

7. The system of claim 4 wherein said milking stall is provided with a cleaning device for cleaning of the milking machine of the milking stall, and wherein the cleaning device is connected to said master computer via said serial bus, and the cleaning device is associated with a bus address.

8. The system of claim 1 further comprising:
at least a second milking stall, which a milking animal visits to be milked automatically, said second milking stall including
a second gate opening/closing arrangement for opening an entry gate to said second milking stall to allow a milking animal to enter said second milking stall after having been identified, and for opening an exit gate from said second milking stall to allow a milking animal to leave said second milking stall after having been milked;
a second milking machine including teat cups connected to a milk collecting vessel, wherein said teat cups, during milking of a milking animal present in said second milking stall, are applied to the teats of the milking animal present in said second milking stall and are connected to a source of vacuum so that milk drawn from the teats of the milking animal present in said second milking stall is collected in the milk collecting vessel; and
a second robot with a robot arm for automatic application of the teat cups to the teats of a milking animal present in said second milking stall;
wherein said master computer holds a database of milking animals available to visit said second milking stall,
said master computer to record points of time, at which each one of the milking animals available to visit said second milking stall is milked therein,
said master computer to receive an identification of a milking animal visiting said second milking stall, and
said master computer to control said second gate opening/closing arrangement, said second milking machine, and said second robot depending on said received identification, and
wherein said second robot includes a slave processor connected to receive information from said master computer, according to which movement of the robot arm of the second robot is to be performed, said slave processor of said second robot to control the second robot to move the robot arm of the second robot according to said received information.

9. The system of claim 8 wherein said second milking stall includes a second animal identification arrangement for identifying a milking animal visiting said second milking stall, wherein said master computer is connected to receive an identification of a milking animal visiting said second milking stall from said second animal identification arrangement.

10. The system of claim 8 wherein said first milking stall is arranged in a first enclosed area and said second milking stall is arranged in a second enclosed area, the two areas being separated so that the milking animals available to visit said first milking stall are different than those available to visit said second milking stall.

11. The system of claim 8 wherein said first and said second milking stalls are commonly arranged in an enclosed area so that the milking animals available to visit said first milking stall are identical with those available to visit said second milking stall.

12. The system of claim 11 wherein said master computer holds a common database of milking animals available to visit said first and said second milking stalls, said common data base to record points of time, at which each one of the milking animals available to visit said first and said second milking stalls is milked in either one of said stalls.

13. The system of claim 8 wherein each robot is provided with a camera and said master computer is connected to receive image related data from each camera to facilitate the control of the respective robot while applying teat cups to the teats of a milking animal present in the respective milking stall.

14. The system of claim 13 wherein said image related data is raw data as recorded by the respective camera.

15. The system of claim 13 wherein each camera is provided with a processor for processing raw data as recorded by the respective camera and for deriving possible teat positions from said raw data, and wherein said image related data received by said master computer includes derived possible teat positions.

16. The system of claim 13 wherein each camera is connected to said master computer via a respective serial cable.

17. The system of claim 8 wherein each robot arm is provided with a gripper, the gripper to
grip teat cups one at a time, at a respective magazine;
move teat cups, one at a time, to beneath the teats of a milking animal present in the respective milking stall; and
apply teat cups, one at a time, to the teats of the respective milking animal.

18. The system of claim 8 wherein each robot includes a pneumatic drive controlled by three valves for the movement of the robot arm in three different directions.

19. The system of claim 8 wherein each robot includes an electrical drive for the movement of the robot arm in three different directions.

20. The system of claim 1 wherein said master computer is provided with input/output means.

21. A method of milking in a computer-controlled milking system having a milking stall, which a milking animal visits to be milked automatically, said method comprising:
identifying a milking animal visiting said milking stall using an animal identification arrangement;
opening an entry gate to said milking stall to allow a milking animal to enter said milking stall depending on said identification using a gate opening/closing arrangement;
milking a milking animal present in said milking stall by applying teat cups of a milking machine to the teats of the milking animal, connecting the teat cups to a source of vacuum, drawing milk from the teats of the milking animal and collecting the milk in a milk collecting vessel of the milking machine, wherein the teat cups are automatically applied to the teats of the milking animal by a robot provided with a robot arm and a gripper;
using a master computer to control the opening of the entry gate and the milking of the milking animal; and
wherein automatically applying the teat cups to the teats of the milking animal includes the steps of:
sending a control message including information, according to which movement of said robot arm of the robot is to be performed, from said master computer to a slave processor of the robot; and
using said slave processor of the robot to control the robot to move the robot arm of the robot according to said received information.

* * * * *